US012594810B2

(12) United States Patent
Lim et al.

(10) Patent No.: US 12,594,810 B2
(45) Date of Patent: Apr. 7, 2026

(54) METHOD AND SYSTEM FOR CONDITIONING VEHICLE BATTERY INTERWORKING WITH REMOTE AIR CONDITIONING

(71) Applicants: Hyundai Motor Company, Seoul (KR); Kia Corporation, Seoul (KR)

(72) Inventors: Jin Gyu Lim, Gumi-si (KR); Hyun Soo Park, Seoul (KR); Dea Ki Cheong, Yongin-si (KR); Tae Hyuck Kim, Seoul (KR); Tae Geun Jeong, Seoul (KR); Dae Kyung Kim, Seoul (KR); Dae Gun Jin, Suwon-si (KR); Joong Woo Lee, Yongin-si (KR); In Seok Park, Seoul (KR); Seung Myun Chung, Seoul (KR); Ki Seung Baek, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 712 days.

(21) Appl. No.: 17/812,406

(22) Filed: Jul. 13, 2022

(65) Prior Publication Data

US 2023/0048488 A1 Feb. 16, 2023

(30) Foreign Application Priority Data

Aug. 13, 2021 (KR) ........................ 10-2021-0107382

(51) Int. Cl.
 B60H 1/00 (2006.01)
(52) U.S. Cl.
 CPC ..... B60H 1/00278 (2013.01); B60H 1/00778 (2013.01); B60H 1/00807 (2013.01); B60H 1/00985 (2013.01)

(58) Field of Classification Search
 CPC ........... B60H 1/00278; B60H 1/00778; B60H 1/00807; B60H 1/00985
 (Continued)

(56) References Cited

U.S. PATENT DOCUMENTS 8,620,506 B2 * 12/2013 Kummer ............. H01M 10/486
180/65.21
8,751,085 B2 * 6/2014 Major ..................... G06F 17/00
320/109
 (Continued)

FOREIGN PATENT DOCUMENTS

KR 10-2013-000537 A 1/2013
KR 10-1519780 B1 5/2015
 (Continued)

OTHER PUBLICATIONS

Office action dated Jan. 17, 2026 for corresponding Korean Patent Application No. 10-2021-0107382. Korean Patent Office.

*Primary Examiner* — Avinash A Savani
*Assistant Examiner* — Dana K Tighe
(74) *Attorney, Agent, or Firm* — Fox Rothschild LLP

(57) ABSTRACT

A system for conditioning a vehicle battery interworking with remote air conditioning includes: a receiving unit that receives remote air conditioning execution setting and in-vehicle battery conditioning execution setting after a vehicle is parked; and a control unit that is configured to determine whether the remote air conditioning execution setting and the in-vehicle battery conditioning execution setting are received, and control to turn on or off vehicle indoor air conditioning and executes battery conditioning based on a determination result.

16 Claims, 4 Drawing Sheets

30

(58) Field of Classification Search
USPC ........................................................ 454/69
See application file for complete search history.

(56) References Cited

U.S. PATENT DOCUMENTS

| | | | | |
|---|---|---|---|---|
| 9,446,682 | B2 * | 9/2016 | Gauthier | .............. G01C 21/343 |
| 10,160,340 | B2 * | 12/2018 | Lindemann | ............. B60L 58/16 |
| 10,293,654 | B2 * | 5/2019 | Treharne | ............ B60H 1/00278 |
| 2021/0013564 | A1 | 1/2021 | Takizawa et al. | |

FOREIGN PATENT DOCUMENTS

| | | |
|---|---|---|
| KR | 10-2015-0075788 A | 7/2015 |
| KR | 10-2023-0024136 A | 2/2023 |

* cited by examiner

METHOD AND SYSTEM FOR CONDITIONING VEHICLE BATTERY INTERWORKING WITH REMOTE AIR CONDITIONING

CROSS REFERENCE TO RELATED APPLICATION

The present application claims under 35 U.S.C. § 119(a) the benefit of Korean Patent Application No. 10-2021-0107382, filed Aug. 13, 2021, the entire contents of which is incorporated herein for all purposes by this reference.

BACKGROUND OF THE INVENTION

Field of the Disclosure

The present disclosure relates to a system and method for conditioning a vehicle battery interworking with remote air conditioning, and more particularly, a system and method for conditioning a vehicle battery interworking with remote air conditioning capable of optimizing battery charging performance by appropriately adjusting the battery temperature of a parked vehicle interworking with the remote air conditioning.

Description of the Technology

With the proliferation of electric cars, plug-in hybrid vehicles growing rapidly in recent years, the matter of battery charging time, which is one of the obstacles in operating a vehicle, may be very important. In general, the charging time of a lithium-ion battery mounted in a vehicle varies greatly depending on whether the battery may be preheated or not. When the battery temperature is room temperature by performing so-called battery conditioning in which the battery is preheated in advance, the charging time during rapid charging of the vehicle may be dramatically reduced.

Conventionally, as a method of increasing the battery temperature, there may be a winter mode function for securing driving performance at a low temperature. This may be an essential function for driving a vehicle when an outside temperature may be extremely low, and it may be far from securing charging performance such as shortening the battery charging time when rapidly charging the vehicle battery.

A vehicle may be hotter in summer and colder in winter, so the battery inside the vehicle may be inevitably affected by the outside temperature. Therefore, remote air condition-ing control means providing convenience to a user by operating the vehicle's air conditioner and heater in advance through the smart device carried by the user. In order to provide the battery charging performance by always adjust-ing the battery temperature to the optimum, a battery tem-perature increase strategy that activates the battery condi-tioning function may be emerging.

The matters described as the background art above are only for improving the understanding of the background of the present disclosure, and should not be taken as an acknowledgment that they correspond to the prior art already known to those of ordinary skill in the art.

SUMMARY OF THE DISCLOSURE

Therefore, the present disclosure has been made in view of the above problems, and it may be an object of the present disclosure to determine whether remote air conditioning execution setting and in-vehicle battery conditioning execu-tion setting may be received by interlocking a battery temperature of a parked vehicle with the remote air condi-tioning, and may optimize the battery charging performance by appropriately controlling the vehicle indoor air condi-tioning and the battery conditioning based on the determined result.

To accomplish the above object, according to one embodi-ment of the present disclosure, there is provided a system for conditioning a vehicle battery interworking with remote air conditioning, including a receiving unit that receives remote air conditioning execution setting and in-vehicle battery conditioning execution setting after a vehicle is parked; and a control unit that may be configured to determine whether the remote air conditioning execution setting and the in-vehicle battery conditioning execution setting are received, and controls to turn on or off vehicle indoor air conditioning and executes battery conditioning based on the determina-tion result.

The control unit may be configured to receive a battery status from a vehicle battery management system when the battery conditioning may be executed.

The battery status may include a battery heater operation status, a battery temperature status, and a battery charge status.

When the control unit controls configured to turn on the vehicle indoor air conditioning and executes the battery conditioning, the control unit controls configured to turn on the vehicle indoor air conditioning to a set reference tem-perature, and increase a battery temperature to the set reference temperature.

The reference temperature for executing the battery con-ditioning may be set manually or automatically.

The control unit may be configured to compare the set reference temperature with a measured vehicle indoor tem-perature, and turn on or off indoor ventilation according to the result to control the vehicle indoor temperature to be maintained at the set reference temperature, and the control unit may be configured to compare the set reference tem-perature with a measured battery temperature, and control to turn on or off a power of a battery heater provided in the battery according to the result to control the battery tem-perature to be maintained at the reference temperature.

A communication terminal that receives and displays the remote air conditioning execution status and the battery conditioning execution status may be further included.

The communication terminal may receive the battery conditioning execution setting through a smartphone appli-cation, and the receiving unit may receive the battery conditioning execution setting input from the communica-tion terminal.

The battery conditioning execution setting input from the communication terminal may include setting an on or off time of a battery conditioning mode and setting a battery heater operation.

In a further embodiment, a vehicle is provided that comprises the system for conditioning a vehicle battery interworking with remote air conditioning as described herein. The vehicle suitably may be, for example, an elec-tric-powered vehicle.

In order to solve the above problem, the method of the present disclosure may include the steps of determining whether remote air conditioning execution is set after park-ing a vehicle; determining whether in-vehicle battery con-ditioning execution is set when it is determined that the remote air conditioning execution is set; and controlling to turn on vehicle indoor air conditioning and executing battery conditioning in a control unit when the in-vehicle battery conditioning execution is set.

The control unit may be configured not to execute the battery conditioning when it may be determined that the remote air conditioning execution may not be set.

In the step of controlling to turn on the vehicle indoor air conditioning and executing the battery conditioning, the vehicle indoor air conditioning may be on-controlled to a set reference temperature and a battery temperature may be increased to the set reference temperature.

In the step of controlling to turn on the vehicle indoor air conditioning and executing the battery conditioning, the set reference temperature may be compared with a measured vehicle indoor temperature and indoor ventilation may be turned on or off according to the result to control a vehicle indoor temperature to be maintained at the set reference temperature, and the set reference temperature may be compared with a measured battery temperature, and on or off of a power of a battery heater provided in the battery may be controlled according to the result to control the battery temperature to be maintained at the reference temperature.

The step of controlling to turn on the vehicle indoor air conditioning and executing the battery conditioning may cause a communication terminal to receive and display the remote air conditioning execution status and the battery conditioning execution status in the control unit.

After the step of determining whether the remote air conditioning execution may be set, the step of determining a battery temperature according to a battery temperature condition for the battery conditioning in the vehicle may be further included.

In the step of determining the battery temperature, only the vehicle indoor air conditioning may be controlled to be turned on when the battery temperature condition for executing the battery conditioning may not be satisfied.

In the step of determining whether the battery conditioning execution may be set, only the vehicle indoor air conditioning may be controlled to be turned on when the battery conditioning execution may not be set.

According to the system and method for conditioning a vehicle battery interworking with remote air conditioning of the present disclosure, it may be determined whether remote air conditioning execution setting and in-vehicle battery conditioning execution setting may be received by interlocking a battery temperature of a parked vehicle with the remote air conditioning, and the battery charging performance may be optimized by appropriately controlling the vehicle indoor air conditioning and the battery conditioning based on the determination result.

The effects obtainable in the present disclosure may not be limited to the above-mentioned effects, and other effects not mentioned could be clearly understood by those of ordinary skill in the art from the following description.

DETAILED DESCRIPTION OF THE INVENTION

Figure 1:
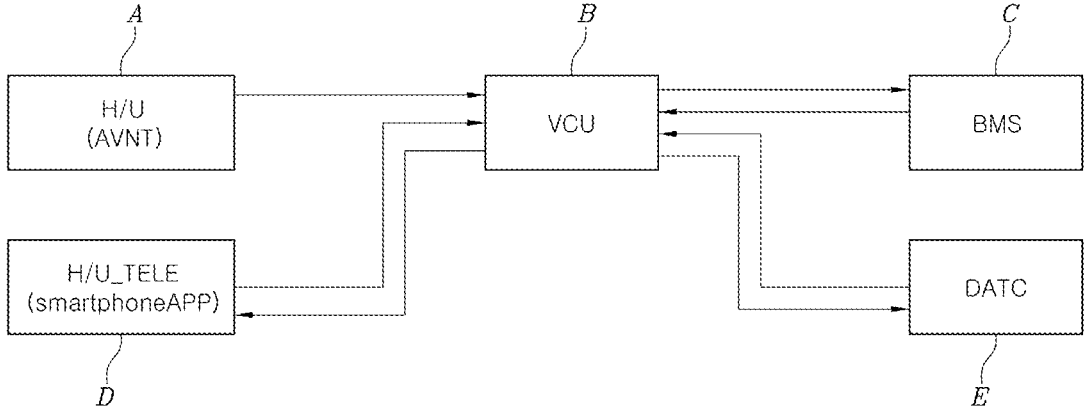
FIG. 1 is a view showing a system for conditioning a vehicle battery interworking with remote air conditioning according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

Specific structural or functional descriptions of the embodiments of the present disclosure disclosed in the present specification or application are only exemplified for the purpose of describing the embodiments according to the present disclosure, and the embodiments according to the present disclosure may be implemented in various forms and should not be construed as being limited to the embodiments described in the present specification or application. Hereinafter, embodiments of the present disclosure will be described in detail with reference to the accompanying drawings.

Figure 4:
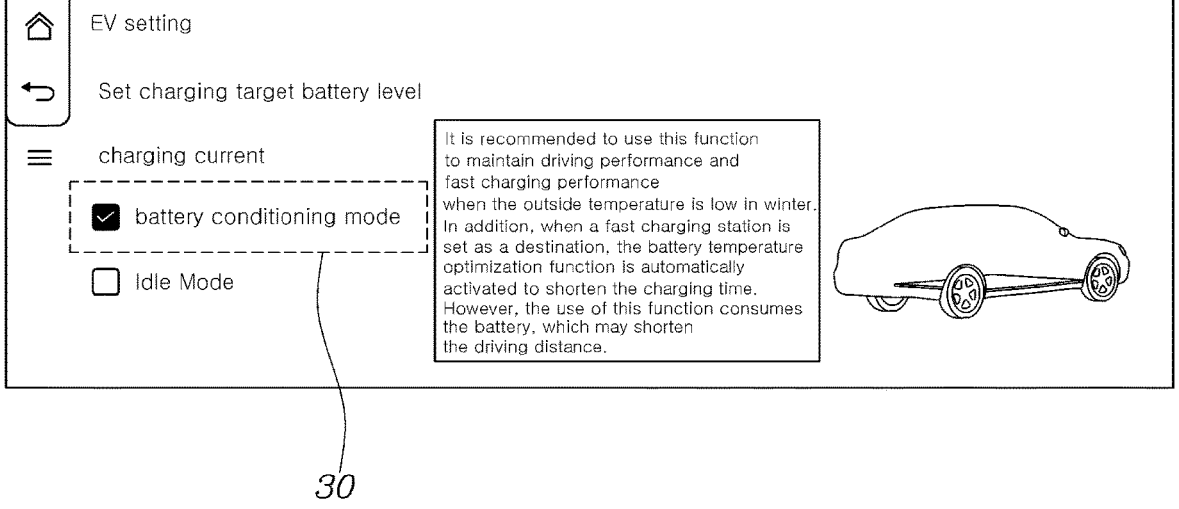
Figure 5:
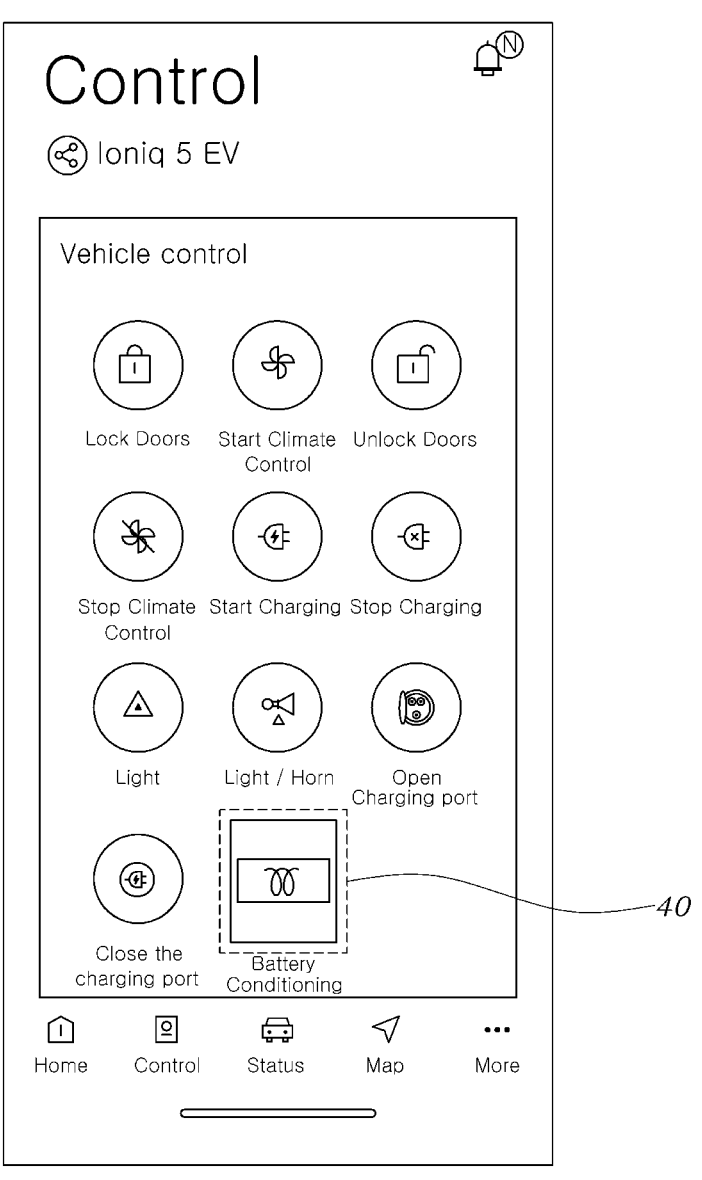
Figure 6:
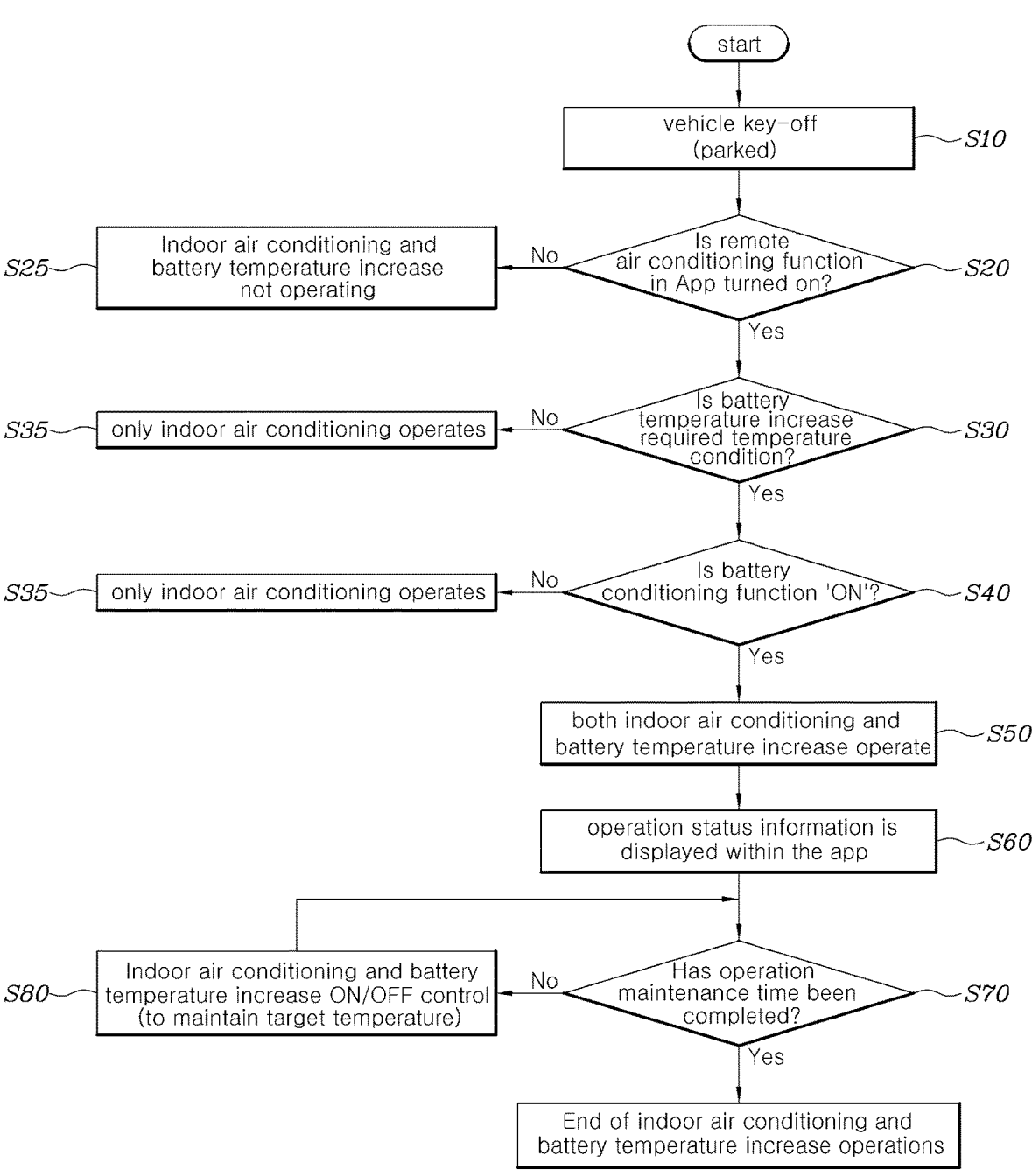
FIG. 6 is a flowchart illustrating an operation of the system for conditioning a vehicle battery interworking with remote air conditioning of FIG. 1.

FIG. 1 is a view showing a system for conditioning a vehicle battery interworking with remote air conditioning according to an embodiment of the present disclosure. FIGS. 2 to 5 are views illustrating examples of a set screen displayed on an Audio, Video, Navigation (AVN) of a vehicle head unit and a communication terminal in a system for conditioning a vehicle battery interworking with remote air conditioning according to an embodiment of the present disclosure. FIG. 6 is a flowchart illustrating an operation of the system for conditioning a vehicle battery interworking with remote air conditioning of FIG. 1.

FIG. 1 is a view showing a system for conditioning a vehicle battery interworking with remote air conditioning according to an embodiment of the present disclosure.

Referring to FIG. 1, a system for conditioning a vehicle battery interworking with remote air conditioning may be configured to include a receiving unit that receives remote air conditioning execution setting and in-vehicle battery conditioning execution setting after a vehicle may be parked; and a control unit (B) that may be configured to determine whether the remote air conditioning execution setting and the in-vehicle battery conditioning execution setting may be received, and controls to turn on or off vehicle indoor air conditioning and executes battery conditioning based on the determination result.

In the present disclosure, it may be determined whether the remote air conditioning execution setting and the in-vehicle battery conditioning execution setting may be received by interlocking the battery temperature of the parked vehicle with the remote air conditioning, and based on the determination result, the vehicle indoor air conditioning and the battery conditioning may be appropriately controlled to optimize the battery charging performance. To this end, it may be determined whether the remote air conditioning execution setting and the in-vehicle battery conditioning execution setting may be received, and the vehicle indoor air conditioning may be controlled to be turned on and the battery conditioning may be executed based on the determination result. Although there may be a conventional winter mode function, which may be a method of increasing a battery temperature, the method may be far from securing charging performance such as shortening the battery charging time when rapidly charging a vehicle battery. In general, in order to secure the charging performance of the battery, a certain temperature of the battery is desirably secured, but setting the optimal battery temperature all the time consumes a lot of energy. Therefore, many technological developments have been made in increasing the battery temperature without consuming much energy in the conventional method of increasing the battery temperature. A vehicle may be hotter in summer and colder in winter, so the battery inside the vehicle may be inevitably affected by the outside temperature. Therefore, a remote air conditioning control means providing convenience to a user by operating the vehicle's air conditioner and heater in advance through the smart device carried by the user. In order to provide the battery charging performance by always adjusting the battery temperature to the optimum, it may be necessary to devise a battery temperature increase strategy that allows the battery conditioning function to work.

Accordingly, the present disclosure may be to secure charging performance by increasing the battery temperature before charging the high voltage battery of the vehicle. A battery temperature increase strategy in which it may be determined whether the remote air conditioning operation setting and the in-vehicle battery conditioning execution setting may be received, and based on the determination result, it may be possible to control to turn on the vehicle indoor air conditioning and to execute battery conditioning may be proposed. Through this, it may be possible for a customer to control and monitor the battery status by himself through a user's smart device. In addition, when the user charges the vehicle battery, it enables active control by enabling the temperature increase operation through remote air conditioning immediately. In addition, when the corresponding function may be activated, the operation status may be displayed on the smart phone application 40, so that it may be possible to check whether the corresponding remote air conditioning control operates normally.

Specifically, the receiving unit (A) receives the remote air conditioning execution setting and the in-vehicle battery conditioning execution setting after the vehicle may be parked. The control unit (B) may be configured to determine whether the remote air conditioning execution setting and the in-vehicle battery conditioning execution setting may be received, and controls to turn on or off the vehicle indoor air conditioning and executes the battery conditioning based on the determination result. Referring to FIG. 1, the receiving unit means AVN (A) in a head unit. As used herein, an Audio, Video, Navigation (AVN) is understood to include an infotainment system of a vehicle. The control unit (B) may be a vehicle control unit (VCU), and the on or off of the battery conditioning mode may be set from the AVN (A) in the head unit. In this case, when the on or off of the battery conditioning mode may not be set, the battery temperature increase does not operate, and only the vehicle indoor air conditioning may be controlled to be turned on. In addition, the vehicle control unit (VCU) may be configured to receive a remote air conditioning request from the communication module (H/U_TELE), which may be the communication terminal (D) of the user, and causes the communication module (H/U_TELE) to receive again and display the remote air conditioning execution status and the battery conditioning execution status. When the user controls to turn on the remote air conditioning through the application 40 of the communication module (H/U_TELE), the corresponding battery temperature increase function operates immediately. In addition, the vehicle control unit (VCU), which may be the control unit (B), activates the IG3 power when the remote air conditioning may be controlled to be turned on. When the power may be activated, the battery heater may be controlled by the battery management system (BMS) (C), and the indoor air conditioning may be controlled by a dual temperature control system (DATC) (D). While remote air conditioning may be controlled to be turned on, the battery management system (BMS) (C) may send the battery status to the vehicle control unit (VCU) (B). In addition, in order to prevent over-discharge of the status of charge (SOC) of the battery, the battery conditioning may be automatically controlled to be turned off after a certain period of time after the operation.

The control unit (B) may be configured to receive a battery status from the vehicle battery management system when executing the battery conditioning.

The battery management system (BMS) manages the vehicle battery as a whole, and checks the charge/discharge of the vehicle battery in which the battery cells may be placed, and the remaining amount of the battery, and transmits and receives them. In addition, the control unit (B) may be configured to activate the IG3 power when the remote air conditioning may be controlled to be turned on, and when the power may be activated, it may also serve to control the battery heater. When the user controls to turn on the remote air conditioning through the application 40 of the communication module (H/U_TELE), the corresponding battery temperature increase function operates immediately. Thus, the battery management system (C) of the vehicle may transmit the battery status to the control unit (B) while the remote air conditioning may be operating, so that the control unit (B) accurately calculates the battery conditioning temperature value, etc., and provides an appropriate value for optimizing the charging performance of the battery. The control unit (B) may refer to the vehicle control unit (VCU), and the control unit (B) controls may be configured to turn on the vehicle indoor air conditioning when the battery conditioning execution setting may be received inside the vehicle. When a user boards the vehicle, the user may be provided with convenience by operating the vehicle's air conditioner and heater in advance through the smart device carried by the user, and by activating the battery conditioning function, the user's satisfaction may be improved, while the vehicle battery may display optimal charging performance. When the remote air conditioning execution setting and the in-vehicle battery conditioning execution setting may be received in the receiving unit, and the control unit (B) may be configured to determine that the remote air conditioning execution setting and the in-vehicle battery conditioning execution setting may be received, the optimization of the vehicle battery charging performance may be selected according to the user's will by the battery conditioning.

The battery status may include a battery heater operation status, a battery temperature status, and a battery charge status.

The control unit (B) may be configured to determine whether the remote air conditioning execution setting and the in-vehicle battery conditioning execution setting may be received, and determines, based on the determination result, whether to control to turn on or off the vehicle indoor air conditioning and whether to execute the battery conditioning, through the battery status received from the battery management system (C). When the battery heater operates and the battery target temperature may be reached, the battery conditioning may be determined to be unnecessary and the battery conditioning may not be executed. Also, even when the battery temperature such as the battery heater reaches the battery target temperature, the battery conditioning may be determined to be unnecessary and the battery conditioning may not be executed. In addition, since the control unit (B) may be configured to control the battery conditioning to be executed when the battery may be charged, the control unit (B) may be configured to receive the battery status from the battery management system (C) of the vehicle in consideration of the battery charge status.

When the control unit (B) controls to turn on the vehicle indoor air conditioning and executes the battery conditioning, the control unit (B) controls may be configured to turn on the vehicle indoor air conditioning to a set reference temperature, and increases the battery temperature to the set reference temperature.

When the control unit (B) may be configured to determine that the remote air conditioning execution setting and the in-vehicle battery conditioning execution setting may be received, and controls to turn on the vehicle indoor air conditioning and executes the battery conditioning, the indoor air conditioning and battery heater may be controlled to rise to the already set battery temperature, which may optimize the battery charging performance. Therefore, since it may be desirable to control so as not to deviate from the set reference temperature, it may be desirable to increase the battery temperature to the preset reference temperature when the vehicle indoor air conditioning may be controlled to be turned on.

The reference temperature for the battery conditioning may be set manually or automatically.

The reference temperature may be generally set at about 10 degrees Celsius for the battery conditioning by the vehicle's setting itself, but depending on the status of charge (SOC) of the battery and the driver's willingness to use the fast charging station or the remaining distance to the charging station, the reference temperature may be set to be adjustable by the user. The degree of additional temperature increase may be determined depending on which charging station may be reached, which depends on the purpose of the user's driving. Therefore, the user determines the status of charge (SOC) of the battery and the will to use the fast charging station or the remaining distance to the charging station, and may manually set such that the reference temperature may be adjusted through the AVN in the vehicle or the communication terminal (D). In addition, the reference temperature for the battery conditioning may be automatically set in the vehicle by determining the status of charge (SOC) of the battery and the remaining distance to the charging station.

The control unit (B) may be configured to compare the set reference temperature with a measured vehicle indoor temperature, and turn on or off the indoor ventilation according to the result to control the vehicle indoor temperature to be maintained at the set reference temperature, and the control unit (B) may be configured to compare the set reference temperature with a measured battery temperature, and controls to turn on/off the power of the battery heater provided in the battery according to the result to control the battery temperature to be maintained at the reference temperature.

After controlling to turn on the vehicle indoor air conditioning to the set reference temperature and increasing the battery temperature to the set reference temperature, a method for controlling the battery temperature may be devised. In this case, the preset temperature by the remote air conditioning execution setting and the measured vehicle indoor temperature may be compared to maintain the set reference temperature. Thus, if the measured vehicle indoor temperature is lower than the set temperature, the vehicle indoor air conditioning may be controlled to be turned on, and if the measured vehicle indoor temperature is higher than the set temperature, the vehicle indoor air conditioning may be controlled to be turned off. In addition, by comparing the set reference temperature and the measured battery temperature with each other, if the measured battery temperature is lower than the set temperature, the control unit (B) may be configured to execute the battery conditioning, and if the measured battery temperature is higher than the set temperature, the control unit (B) may be configured not to execute the battery conditioning.

FIGS. 2 to 5 are views illustrating examples of a setting screen displayed on the AVN of the vehicle head unit and the communication terminal (D) in the system for conditioning a vehicle battery interworking with remote air conditioning according to an embodiment of the present disclosure.

Referring to FIGS. 2 to 5, the system further includes the communication terminal (D) that receives and displays the remote air conditioning execution status and the battery conditioning execution status.

Figure 2:
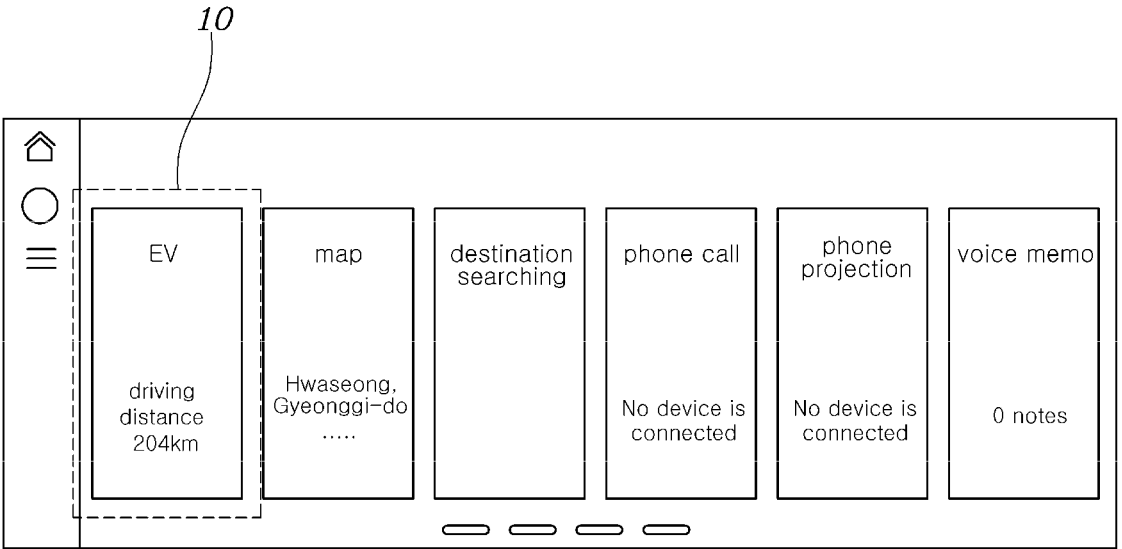
FIGS. 2 to 5 are views illustrating examples of a set screen displayed on an Audio, Video, Navigation (AVN) of a vehicle head unit and a communication terminal in a system for conditioning a vehicle battery interworking with remote air conditioning according to an embodiment of the present disclosure.
Figure 3:
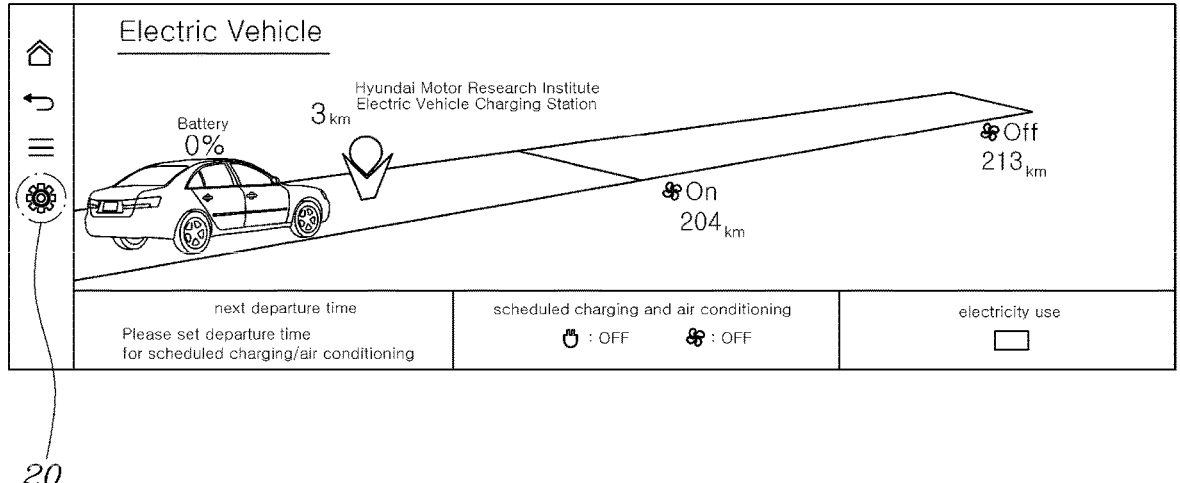

The communication terminal (D) refers to the communication module (H/U_TELE) shown in FIG. 1 and generally refers to a user's smart device. The communication terminal (D) receives and displays the remote air conditioning execution status and the battery conditioning execution status, and when the user controls to turn on the remote air conditioning through the application 40 installed in the communication terminal (D), the corresponding battery temperature increase function may be immediately operated. Therefore, the user recognizes through the remote air conditioning execution status and the battery conditioning execution status displayed by the communication terminal (D), and when the user tries to charge the vehicle battery, the temperature increase operation may be immediately enabled through the remote air conditioning to enable active control. In addition, when the corresponding function may be activated, the operation status may be displayed on the smart phone application 40, so that it may be possible to check whether the corresponding remote air conditioning control may be normally controlled to be turned on. Referring to FIGS. 2 to 5, the AVN of the vehicle head unit and the application 40 installed in the communication terminal (D) may be illustrated. FIGS. 2 to 4 show the sequence (10, 20, 30) for executing the battery conditioning in the AVN of the vehicle head unit, and FIG. 5 shows a hypothetical battery conditioning interworking with the remote air conditioning in the application 40 installed in the communication terminal (D). The AVN of the vehicle head unit and the communication terminal (D) interwork with each other to enable the control unit (B) to control to turn on or off the vehicle indoor air conditioning and to execute the battery conditioning, thereby enabling the active control.

The communication terminal (D) receives the battery conditioning execution setting through the smartphone application 40, and the receiving unit receives the battery conditioning execution setting input from the communication terminal (D).

In addition to being able to set the battery conditioning execution inside the vehicle, the user may directly set the battery conditioning execution setting on the smartphone application 40 of the communication terminal (D). When the user directly inputs the battery conditioning execution setting through the communication terminal (D) such as the user's mobile device, the receiving unit receives the battery conditioning execution setting, and from outside the vehicle, the user controls to turn on the battery conditioning execution setting of the vehicle. If the vehicle needs to execute the battery conditioning, the battery conditioning may be executed in advance, so that the battery conditioning may be appropriately controlled to optimize the battery charging performance.

The battery conditioning execution setting input from the communication terminal (D) may include setting an on or off time of the battery conditioning mode and setting the battery heater operation.

In another embodiment of the present disclosure, a technology that enables a customer to set the on-control maintenance time of the remote air conditioning may be applied. In the case of our current remote air conditioning, it may be designed to be on-controlled immediately after operation. When the battery heater may be operated, an EV vehicle has the advantage of not generating separate soot. In addition, when the vehicle may be left unattended in a cryogenic state for a long time, it may not be sufficient for the battery temperature increase operation. Therefore, if a customer may selectively select the on-control maintenance time of the air conditioning, the problem that the battery temperature may not be sufficiently increased at extremely low temperatures may be solved. As another embodiment of the present disclosure, a technology for remotely operating the battery heater separately from the indoor air conditioning may be applied. Since the heater for the indoor air conditioning and the heater for the battery temperature increase may be currently separately mounted on the vehicle, it may be possible to operate the battery heater separately from the air conditioning. If it may be possible to control the indoor air conditioning and the battery conditioning in the smartphone application 40, respectively, it will be possible to separately operate the two functions according to the user's will. This makes it possible to use the vehicle's energy more efficiently.

FIG. 6 is a flowchart illustrating an operation of the system for conditioning a vehicle battery interworking with remote air conditioning of FIG. 1.

Referring to FIG. 6, a method for conditioning a vehicle battery interworking with remote air conditioning including a step (S20) of determining whether the remote air conditioning execution may be set after parking the vehicle (S10); a step (S40) of determining whether the in-vehicle battery conditioning execution may be set when it may be determined that the remote air conditioning execution may be set; and a step (S50) of controlling to turn on the vehicle indoor air conditioning and executing the battery conditioning in the control unit (B) when the in-vehicle battery conditioning execution may be set may be introduced.

Detailed technical characteristics in each step of the method for conditioning a vehicle battery interworking with remote air conditioning according to the present disclosure may be the same as or similar to the technical characteristics of each configuration in the system for conditioning a vehicle battery interworking with remote air conditioning according to the present disclosure described above, so detailed description thereof may be omitted.

The step (S20) of determining whether remote air conditioning execution may be set may further include a step (S25) of not operating the vehicle indoor air conditioning and battery temperature increase when the remote air conditioning execution may not be set.

When it may be determined that the remote air conditioning execution may not be set, the control unit (B) may not execute the battery conditioning.

In the step (S50) of controlling to turn on the vehicle indoor air conditioning and executing the battery conditioning, the vehicle indoor air conditioning may be on-controlled to a set reference temperature and the battery temperature may be increased to the set reference temperature.

In the step (S50) of controlling to turn on the vehicle indoor air conditioning and executing the battery conditioning, the set reference temperature may be compared with the measured vehicle indoor temperature and the indoor ventilation may be turned on or off according to the result to control the vehicle indoor temperature to be maintained at the set reference temperature. The set reference temperature may be compared with the measured battery temperature, and the on or off of the power of the battery heater provided in the battery may be controlled according to the result to control the battery temperature to be maintained at the reference temperature.

The step (S50) of controlling to turn on the vehicle indoor air conditioning and executing the battery conditioning causes the communication terminal (D) to receive and display the remote air conditioning execution status and the battery conditioning execution status in the control unit (B) (S60).

After the step (S60) of receiving and displaying the remote air conditioning execution status and the battery conditioning execution status by the communication terminal (D), the step (S70) of determining whether the conditioning execution maintenance time for the battery temperature increase has elapsed may be further included.

In the step (S70) of determining whether the conditioning execution maintenance time may be completed, the vehicle indoor air conditioning may be controlled to be turned on or off and the battery conditioning may be executed when the conditioning execution maintenance time has not elapsed (S80).

After the step (S20) of determining whether the remote air conditioning execution may be set, the step (S30) of determining the battery temperature according to a battery temperature condition for the battery conditioning in the vehicle may be further included.

In the step (S30) of determining the battery temperature according to the battery temperature condition, only the vehicle indoor air conditioning may be controlled to be turned on when the battery temperature does not satisfy the battery temperature condition (S35).

In the step (S40) of determining whether the battery conditioning execution may be set, only the vehicle indoor air conditioning may be controlled to be turned on when the battery conditioning execution may not be set (S35).

As described above, although shown and described in relation to specific embodiments of the present disclosure, it will be apparent to one of ordinary skill in the art that the present disclosure may be variously improved and changed without departing from the spirit of the present disclosure provided by the following claims.

DESCRIPTION OF REFERENCE NUMERALS

A: AVN in a head unit
B: vehicle control unit (VCU), control unit
C: battery management system (BMS)
D: communication terminal
E: dual temperature control system (DATC)
10, 20, 30: sequence in the AVN of a vehicle head unit
40: application installed on communication terminal

What is claimed is:

1. A system for conditioning a vehicle battery interworking with remote air conditioning comprising:
   a receiving unit that receives remote air conditioning execution setting and in-vehicle battery conditioning execution setting after a vehicle is parked; and
   a control unit configured to determine whether the remote air conditioning execution setting and the in-vehicle battery conditioning execution setting are received, and controls to turn on or off vehicle indoor air conditioning and executes battery conditioning based on a determination result,
   wherein when the control unit is configured to control to turn on the vehicle indoor air conditioning and execute the battery conditioning, the control unit is configured to control to turn on the vehicle indoor air conditioning to a set reference temperature, and increase a battery temperature to the set reference temperature, during an on-control maintenance time of the vehicle indoor air conditioning included in the remote air conditioning execution setting.

2. The system according to claim 1, wherein the control unit is configured to receive a battery status from a vehicle battery management system when the battery conditioning is executed.

3. The system according to claim 2, wherein the battery status includes a battery heater operation status, a battery temperature status, and a battery charge status.

4. The system according to claim 1, wherein the reference temperature for executing the battery conditioning is set manually or automatically.

5. The system according to claim 1, wherein the control unit is configured to compare the set reference temperature with a measured vehicle indoor temperature, and turns on or off indoor ventilation according to a comparison result to control the vehicle indoor temperature to be maintained at the set reference temperature, and the control unit is configured to compare the set reference temperature with a measured battery temperature, and controls to turn on or off power of a battery heater provided in the battery according to the comparison result to control the battery temperature to be maintained at the reference temperature.

6. The system according to claim 1, further comprising a communication terminal that receives and displays a remote air conditioning execution status and a battery conditioning execution status.

7. The system according to claim 6, wherein the communication terminal receives a battery conditioning execution setting through a smartphone application, and the receiving unit receives the battery conditioning execution setting input from the communication terminal.

8. The system according to claim 7, wherein the battery conditioning execution setting input from the communication terminal includes setting an on or off time of a battery conditioning mode and setting a battery heater operation.

9. A vehicle comprising the system for conditioning a vehicle battery interworking with remote air conditioning of claim 1.

10. A method for conditioning a vehicle battery in conjunction with remote air conditioning, comprising the steps of:
    determining whether remote air conditioning execution is set after parking a vehicle;
    determining whether in-vehicle battery conditioning execution is set when it is determined that the remote air conditioning execution is set; and controlling to turn on vehicle indoor air conditioning and executing battery conditioning in a control unit when the in-vehicle battery conditioning execution is set, wherein the controlling step includes controlling to turn on the vehicle indoor air conditioning to a set reference temperature, and increasing a battery temperature to the set reference temperature, during an on-control maintenance time of the vehicle indoor air conditioning included in the remote air conditioning execution setting.

11. The method according to claim 10, wherein the control unit is configured to not execute the battery conditioning when it is determined that the remote air conditioning execution is not set.

12. The method according to claim 10, wherein in the step of controlling to turn on the vehicle indoor air conditioning and executing the battery conditioning, the set reference temperature is compared with a measured vehicle indoor temperature and indoor ventilation is turned on/off according to a comparing result to control a vehicle indoor temperature to be maintained at the set reference temperature, and the set reference temperature is compared with a measured battery temperature, and on/off of a power of a battery heater provided in the battery is controlled according to the comparing result to control the battery temperature to be maintained at the reference temperature.

13. The method according to claim 10, further comprises, after the step of controlling to turn on the vehicle indoor air conditioning and executing the battery conditioning, the step of receiving and displaying a remote air conditioning execution status and a battery conditioning execution status in a communication terminal of the control unit.

14. The method according to claim 10, further comprising, after the step of determining whether the remote air conditioning execution is set, the step of determining a battery temperature according to a battery temperature condition for the battery conditioning in the vehicle.

15. The method according to claim 14, wherein in the step of determining the battery temperature, only the vehicle indoor air conditioning is controlled to be turned on when the battery temperature condition for executing the battery conditioning is not satisfied.

16. The method according to claim 10, wherein in the step of determining whether the battery conditioning execution is set, only the vehicle indoor air conditioning is controlled to be turned on when the battery conditioning execution is not set.

* * * * *